United States Patent
Bickley et al.

(10) Patent No.: US 7,013,276 B2
(45) Date of Patent: Mar. 14, 2006

(54) METHOD OF ASSESSING DEGREE OF ACOUSTIC CONFUSABILITY, AND SYSTEM THEREFOR

(75) Inventors: Corine A. Bickley, Somerville, MA (US); Lawrence A. Denenberg, Brookline, MA (US)

(73) Assignee: Comverse, Inc., Wakefield, MA (US)

( * ) Notice: Subject to any disclaimer, the term of this patent is extended or adjusted under 35 U.S.C. 154(b) by 737 days.

(21) Appl. No.: 09/971,012

(22) Filed: Oct. 5, 2001

(65) Prior Publication Data

US 2003/0069729 A1    Apr. 10, 2003

(51) Int. Cl.
G10L 15/00        (2006.01)

(52) U.S. Cl. ..................... 704/255; 704/256
(58) Field of Classification Search ............... 704/255, 704/256, 257
See application file for complete search history.

(56) References Cited

U.S. PATENT DOCUMENTS

| | | | |
|---|---|---|---|
| 4,972,485 A * | 11/1990 | Dautrich et al. ............ | 704/251 |
| 5,097,509 A | 3/1992 | Lennig | |
| 5,452,397 A | 9/1995 | Ittycheriah et al. | |
| 5,638,425 A | 6/1997 | Meador, III et al. | |
| 5,664,058 A | 9/1997 | Vysotsky | |
| 5,737,723 A * | 4/1998 | Riley et al. ................. | 704/243 |
| 5,778,344 A | 7/1998 | Attwater et al. | |
| 5,799,276 A | 8/1998 | Komissarchik et al. | |
| 5,960,393 A | 9/1999 | Cohrs et al. | |
| 5,987,411 A | 11/1999 | Petroni et al. | |
| 6,014,624 A | 1/2000 | Raman | |
| 6,049,594 A | 4/2000 | Furman et al. | |
| 6,073,099 A * | 6/2000 | Sabourin et al. ............ | 704/256 |
| 6,122,361 A | 9/2000 | Gupta | |
| 6,134,527 A | 10/2000 | Meunier | |
| 6,185,530 B1 * | 2/2001 | Ittycheriah et al. ......... | 704/255 |
| 6,360,197 B1 * | 3/2002 | Wu et al. ...................... | 704/9 |

OTHER PUBLICATIONS

Stevens, Kenneth, N., *From Acoustic Cues To Segments, Features, and Words*, Proc. 6th International Conference on Spoken Language Processing (ICSLP 2000), Beijing China, Oct. 16-20, 2000—pp. 1-8.

Stevens, K.N (1992) *Lexical access from features*, MIT Speech Communication Group Working Papers, VIII, 119-144.

Stevens, K.N., Manuel, S.Y., Shattuck-Hufnagel, S., and Liu, S. (1992), *Implementation of a model for lexical access based on features*, in J.J. Ohala, T.M. Nearey, G.L. Derwing, M.M. Hodge, and G.E. Wiebe (Eds.), Proceedings of the 1992 International Conference on Spoken Language Processing, Edmonton, Canada: University of Alberta- pp. 499-502.

(Continued)

*Primary Examiner*—Daniel Abebe
(74) *Attorney, Agent, or Firm*—Staas & Halsey LLP

(57) ABSTRACT

Predicting speech recognizer confusion where utterances can be represented by any combination of text form and audio file. The utterances are represented with an intermediate representation that directly reflects the acoustic characteristics of the utterances. Text representations of the utterances can be directly used for predicting confusability without access to audio file examples of the utterances. First embodiment: two text utterances are represented with strings of phonemes and one of the strings of phonemes is transformed into the other strings of phonemes for a least cost as a confusability measure. Second embodiment: two utterances are represented with an intermediate representation of sequences of acoustic events based on phonetic capabilities of speakers obtained from acoustic signals of the utterances and the acoustic events are compared. Predicting confusability of the utterances according to a formula 2K/(T), K is a number of matched acoustic events and T is a total number of acoustic events.

33 Claims, 7 Drawing Sheets

OTHER PUBLICATIONS

Bitar, N., and Espy-Wilson, C. (1995), *A signal representation of speech based on phonetic features*, Proceedings of IEEE Dual-Use Technology and Applications Conference, 310-315.

Ariel Salomon and Carol Espy-Wilson (1999), *Automatic Detection of manner events based on temporal parameters*, Proc. Eurospeech, Sep. '99, pp. 2797-2800.

Wagner, RA and Fischer, MJ (1974), *The string-to-string correction problem*, Journal of the Association for Computing Machinery, 21, 168-173.

Cormen, Leiserson, and Rivest (1990), *Introduction to Algorithms*, Cambridge, MA: MIT Press, Chapter 34, pp. 853-885.

Greenberg, S. (2000), *Understanding Spoken Language using Statistical and Computational Methods*, Presented at Patterns of Speech Sounds in Unscripted Communication—Production, Perception, Phonology, Akademie Sandelmark, Germany, Oct. 8-11.

Greenberg, S., and S. Chang. (2000), *Linguistic Dissection of Switchboard-Corpus: Automatic Speech Recognition Systems*, Presented at the ISCA Workshop on Automatic Speech Recognition: Challenges for the New Millennium, Paris, Sep. 18-20, 2000.

Liu, S. (1995), *Landmark Detection for Distinctive Feature-based Speech Recognition*, Ph.D. Thesis, Cambridge, MA: Massachusetts Institiute of Technology.

Syrdal, Ann K. (1984), *Aspects of an auditory representation of American English vowels*, Speech Communication Group Working Papers, vol. IV, Research Laboratory of Electronics, Massachusetts Institute of Technology, pp. 27-41.

Nearey, T.M. and Assmann, P. (1986) *Modeling the role of vowel inherent spectral change in vowel identification*, Journal of the Acoustical Society of America 80, pp. 1297-1308.

Fell, H.J., L.J. Ferrier, C. Espy-Wilson, S.G. Worst, E.A. Craft, K. Chenausky, J. MacAuslan, and G. Hennessey (2000), *Analysis of Infant Babbles by the Early Vocalization Analyzer*, Presented at the American Speech-Language-Hearing Convention, Nov. 17, 2000.

Fell, H.J., J. MacAusian, K. Chenausky, and L.J. Ferrier (1998), *Automatic Babble Recognition for Early Detection of Speech Related Disorders*, Assets'98, Proceedings of the Third Internatinal ACM SIGCAPH Conference on Assistive Technologies, Marina del Rey, CA.

Fell, H.J., L.J. Ferrier, Z. Mooraj, E. Benson, and D. Schneider (1996), *EVA, an Early Vocalization Analyzer, An Empirical Validity Study of Computer Categorization*, Assets '96, Proceedings of the Third International ACM SIGCAPH Conference on Assistive Technologies.

Hillenbrand, J.M., and M.J. Clark (2000), *Effects of consonant environment on vowel formant patterns*, J. Acoust. Soc. Am. 109(2), pp. 748-763.

Howitt, A.W. (1991), *Application of the Wigner distribution to speech analysis*, MIT Speech Communication Group Working Papers, VII, pp. 23-46.

International Computer Science Institute, *Welcome to the NIST Scoring Tooklit Version 0.1, Sclite—score speech recognition system output* (http://www.icsi.berkeley.edu/speech/docs/sctk-1.2/sclite.htm), Sclite Revision.txt, Index of/speech/docs/sctk-1.2 (program documentation for software tool known as "sclite" as part of NIST Scoring Toolkit (SCTK) software tools), Apr. 6, 1998.

* cited by examiner

| AFs AND AMs FOR "JILL" | AFs AND AMs FOR "PHIL" | COMPARISON RESULT |
|---|---|---|
| +AlveolarStop | +WeakFricative | NO MATCH |
| +PalatalFricative | -WeakFricative | NO MATCH |
| -PalatalFricative | | NO MATCH |
| +SylVow(F1-F0=80 Hz) | +SylVow(F1-F0=70 Hz) | MATCH (WITHIN JND) |
| +SylVow(F2-F1=1600 Hz) | +SylVow(F2-F1=1580 Hz) | MATCH (WITHIN JND) |
| -SylVow(F1-F0=130 Hz) | -SylVow(F1-F0=130 Hz) | MATCH |
| -SylVow(F2-F1=1420 Hz) | -SylVow(F2-F1=1420 Hz) | MATCH |
| +SylLiq(F1-F0=60 Hz) | +SylLiq(F1-F0=60 Hz) | MATCH |
| +SylLiq(F2-F1=1490 Hz) | +SylLiq(F2-F1=1490 Hz) | MATCH |
| -SylLiq(F1-F0=60 Hz) | -SylLiq(F1-F0=60 Hz) | MATCH |
| -SylLiq(F2-F1=1450 Hz) | -SylLiq(F2-F1=1450 Hz) | MATCH |
| TOTAL: 11 AFs AND AMs | 10 AFs AND AMs | 8 MATCHES |

(1) PERCENTAGE CONFUSABILITY: 2K / (N+M) OR (2x8) / (11+10) = APPROXIMATELY 76%

JND RANGE: WITHIN THE RANGE 0 - 500 Hz, JND = 30Hz
WITHIN THE RANGE 501 - 1000 Hz, JND = 50Hz
WITHIN THE RANGE 1001 - 2000 Hz, JND = 70 Hz
WITHIN THE RANGE 2001 - 4000 Hz, JND = 100 Hz
OVER 4001 Hz, JND = 200 Hz

FIG. 6

METHOD OF ASSESSING DEGREE OF ACOUSTIC CONFUSABILITY, AND SYSTEM THEREFOR

BACKGROUND OF THE INVENTION

1. Field of the Invention

The present invention relates to a system predicting acoustic confusability of text phrases and audio data that is speech-recognition system independent. In particular, the system predicts speech recognizer confusion where utterances can be represented by any combination of a text form (text phrase/spelled form) and an audio file (audio data/phrase). For example:

Case 1: acoustic confusability predicted between two text phrases; and

Case 2: acoustic confusability predicted between two utterances, each of which may be represented either as a text phrase or an audio file.

2. Description of the Related Art

Using Acoustic Confusability Information in Voice Application Software:

Voice application software use speech recognizers to provide a voice user interface. For example, a voice application providing voice messaging uses a speech recognizer to process user voice commands such as "play message" and "save message." In another example, a voice application providing voice messaging uses a speech recognizer to voice enroll names in an address book. In the context of speech recognizers, spoken phrases are deemed confusable if they sound alike. Typical voice application software use information on when the speech recognizer will confuse spoken phrases (i.e., also referred to as acoustic confusability by the speech recognizer). The capability of predicting acoustic confusability can be used by a voice application, for example, to alert a user to choose a different name when voice enrolling names in the address book, thereby reducing the risk of inefficient or inaccurate voice command processing by the voice application.

Spoken phrases that control a voice user interface of a voice application can have very similar pronunciations, but actually refer to different actions or persons. Two spoken phrases can confuse a speech recognizer due to similarities in pronunciations of the two spoken phrases. For example, the speech recognizer might confuse spoken phrases such as "Jill" and "Phil," although only half of the letters in the text form of utterances (words/phrases) "Jill" and "Phil" are the same. In another example, the speech recognizer might confuse "reply" spoken by one speaker with "repeat" spoken by another speaker having a dialect that reduces final syllables.

Some typical speech recognizers recognize a spoken phrase by comparing the spoken phrase to a designed list of utterances (words/phrases) represented as audio files. For example, one type of typical speech recognizer recognizes a spoken phrase by finding the most similar phrase in its list of phrases with a given spoken phrase. Avoiding adding phrases on the list that may be confusable with each other reduces the possibility that the speech recognizer will erroneously recognize a given spoken phrase (i.e., one that appears on the list) as a different spoken phrase on the list, a mistake known as a substitution error. Phrases can be added to the list as follows: providing utterances represented as text forms, providing utterances represented as audio files (by speaking and recording the spoken phrase), and a combination of text form and audio file of utterances.

Speech recognizers include algorithms to predict the acoustic similarity of two spoken phrases. The typical algorithms compare sets of acoustic measures to classify sounds in the spoken phrases. However, these algorithms do not predict acoustic similarity between text forms of utterances, and thereby cannot compare one utterance represented as an audio file to a text form of another utterance to predict similarity of the one utterance represented as the audio file to spoken examples of the text form of the other utterance.

Although typical speech recognizers compare sets of acoustic measures to classify sounds in spoken phrases, text forms of utterances can also be used to predict confusability of the text forms when spoken. However, for some languages, such as English, pronunciation similarities may not be obvious from the text forms (i.e., spelling) of utterances because there may not be a direct correspondence between the spelling and the pronunciation. In contrast, similarities in pronunciation can be more apparent from comparisons between phonetic transcriptions of utterances (existing speech recognizers use various equivalent phonetic representations) than from examination of the spellings of the utterances. In a language, phonetic transcriptions represent pronunciations by using different symbols to represent each phoneme, or sound unit (i.e., string of phonemes or phonetic symbols). However, phonetic transcriptions alone, or strings of phonemes, are not sufficient to predict confusability for the following reasons: first, because speech recognizers do not compare phonetic symbols, but instead, compare sets of acoustic measures to classify sounds as spoken phrases. Second, in many instances, different phonemes, such as the vowel in "pin" and the vowel in "pen," may be acoustically similar (the sounds are similar), but represented by phonetic symbols that are different. For example, phonetic transcriptions of the words "pin" and "pen" differ by 33% (one of three phonemes), but can still be confusable by a speech recognizer because of the acoustic similarity of the vowels.

Typical acoustic confusability methods used by speech recognizers have a disadvantage because the typical acoustic confusability methods compare audio files with audio files. As a result, typical acoustic confusability methods are only useful in an application where only voice utterances (utterances represented as audio files) are used. For example, if names can be entered into a voice-controlled address book only by voice enrollment, then typical methods can be used to detect confusability among the address book entries. However, the typical acoustic confusability methods would not be useful in an application where voice and text are mixed. If names can be entered into an address book either by text or by voice, a method is needed to compare a text name to a voice name, so that names from a text enrolled address book can reliably (and not confusingly) be added to a voice enrolled address book. In the case of entering a name by voice, a method is needed to predict acoustic confusability between an utterance represented as an audio file and an utterance represented as a text form to compare the newly added voice name to the text enrolled names already in the address book. In the case of entering a name by text, a method is needed to predict acoustic confusability between a an utterance represented as a text form and an utterance represented as an audio file to compare the newly added text name to the voice enrolled names already in the address book.

Typical acoustic confusability methods that compare audio files with audio files have another disadvantage as follows: speech recognition can be either speaker independent or speaker dependent. When providing text to a speech recognizer, the techniques used to recognize speech would be speaker independent. When providing audio files to a speech recognizer, the techniques used to recognize speech can be either speaker independent or speaker dependent. However, speech recognition by typical speech recognizers is likely to be speech recognizer dependent (i.e., speaker dependent) when the speech recognizer is provided a combination of text phrases and audio files because the typical speech recognition system algorithms do not predict acoustic similarity (recognize speech) between a combination of a text form of an utterance and an audio file of an utterance by directly using the text form. Typical speech recognition system algorithms would convert text to speech, so that two audio files can be compared. Such conversion can cause speech recognition to be speech recognition system dependent. Therefore, a more reliable method to predict acoustic confusability is needed when using a combination of a text phrase and an audio file.

Using Acoustic Confusability Information When Developing Voice Application Software:

A voice user interface (i.e., a call flow) is developed or generated using text phrases representing voice commands. Acoustic confusability predictability information can, for example, be used when developing voice applications to avoid using a voice command in a call flow that may be confusable with other voice commands, for efficient, accurate and reliable call flow processing (voice command differentiation) by the voice application speech recognizer. However, typical speech recognizers compare sets of acoustic measures to classify sounds in spoken phrases, and do not directly use text phrases (i.e., not tied to comparing recorded speech signals) to predict acoustic confusability. Therefore, a process for development of a voice user interface typically includes counting syllables and comparison of vowels of the text phrases to select text phrases that are likely to be acoustically distinct (i.e., not confusable) when spoken as commands. To improve call flow processing using the typical acoustic confusability methods used by the speech recognizers would require, for example, text-to-speech conversions, which may not be efficient or practical. If acoustic confusability of text phrases representing voice commands can be predicated by directly using the text phrases, improved, more robust, and reliable voice user interfaces can be developed or generated.

Acoustic Distinctiveness of Spoken Phrases:

The acoustic distinctiveness of spoken phrases has been well understood for many years. The "landmark" theory of Stevens is one body of work that encapsulates much of what has been discovered about the acoustics of speech. Stevens, Kenneth, N., *From Acoustic Cues To Segments, Features, and Words*, Proc. 6$^{th}$ International Conference on Spoken Language Processing (ICSLP 2000), Beijing China, Oct. 16–20, 2000—pp. 1–8; Stevens, K. N (1992) *Lexical access from features*, MIT Speech Communication Group Working Papers, VIII, 119–144; and Stevens, K. N., Manuel, S. Y., Shattuck-Hufnagel, S., and Liu, S. (1992), *Implementation of a model for lexical access based on features*, in J. J. Ohala, T. M. Nearey, G. L. Derwing, M. M. Hodge, and G. E. Wiebe (Eds.), Proceedings of the 1992 International Conference on Spoken Language Processing, Edmonton, Canada: University of Alberta—pp. 499–502 (hereinafter Stevens and the contents of which are hereby incorporated by reference).

Landmarks are points in a spoken phrase around which one may extract information about the underlying distinctive acoustic features (AFs). Landmarks mark perceptual foci and articulatory targets. One type of landmark is linked to glottal activity and can be used to identify vocalic segments of the speech signal. Other landmarks identify intervals of sonorancy, i.e. intervals when the oral cavity is relatively unconstricted. The most common landmarks are acoustically abrupt and are associated with consonantal segments, e.g., a stop closure and release.

Others have implemented methods to extend Stevens' landmark theory. Bitar, N., and Espy-Wilson, C. (1995), *A signal representation of speech based on phonetic features*, Proceedings of IEEE Dual-Use Technology and Applications Conference, 310–315 (hereinafter Bitar); and *Automatic Detection of manner events based on temporal parameters*, Proc. Eurospeech, September. '99, pp. 2797–2800 (hereinafter Salomon) (the contents of which are hereby incorporated by reference). Salomon has developed the following AFs as acoustic events: the manner-of-articulation or phonetic features (sonorant, syllabic, fricative, and consonantal) and the place-of-articulation phonetic or nonsyllabic features (labial, alveolar, and velar for stops; and palatal and alveolar for strident fricatives). Some acoustic events, such as the ones associated with the phonetic feature sonorant, segment the speech signal into regions. Others, such as those associated with nonsyllabic features, mark particular instants in time. From the Salomon AFs, the following twelve speech classes can be detected from the physical signal: syllabic vowel, syllabic nasal, syllabic liquid, semivowel, nasal, palatal fricative, alveolar fricative, affricate, labial stop, alveolar stop, velar stop, and weak fricative. A series of speech recognition experiments by Salomon illustrate robustness of the acoustic events based on AFs. Results disclosed in Salomon indicate that compared to traditional speech recognition processing, such as spectral processing with a state-of-the-art Hidden-Markov Model, the AFs can (a) better target the linguistic information in a speech signal, and (b) reduce inter-speaker variability. Therefore, the AFs can be used by voice applications when predicting acoustic confusability that is speaker-independent.

SUMMARY OF THE INVENTION

The present invention provides a method and system therefore of predicting when a speech recognizer will confuse "spoken phrases." More particularly, the present invention provides a method and system therefore of predicting when a speech recognizer will confuse "spoken phrases" where utterances can be represented by any combination of text form (text phrase/spelled form) and an audio file (audio data/phrase, conventional recorded speech signals/data). A "spoken phrase" refers to an utterance (word/phrase) spoken, for example by a user, to a speech recognizer during operation. A "text form" refers to a textual form of an utterance (text phrase) to be recognized/heard by the speech recognizer. An audio file refers to an acoustic form of an utterance to be recognized/heard by the speech recognizer (i.e., training from acoustic examples). Therefore, utterances are spoken phrase representations, which can be represented as either an audio file or a text form to be recognized/heard by a speech recognizer. The present invention provides receiving a pair of spoken phrase representations (i.e., any combination of a text form of a spoken phrase and an audio file of a spoken phrase to be recognized by a speech recognizer), and representing the pair of spoken phrase representations with an intermediate representation that directly reflects the acoustic distinctiveness, or inversely, similarity of the pair of spoken phrase representations. In the present invention, the intermediate representation is not tied to pre-recorded speech signals, thereby providing a method and system to predict confusability of spoken phrases that can be speaker independent and situation independent (i.e., confusability may be predicted even when background noise is present or when background noise conditions are poor or changing). The present invention's choice of intermediate representation is useful in providing speaker independent and situation independent speech recognition and acoustic confusability information.

Further, the present invention provides a method and system to predict when a speech recognizer will confuse spoken phrases by directly using text forms of the spoken phrases. Therefore, the method and system according to the present invention can predict when a speech recognizer will confuse spoken phrases without access to audio file examples and not tied to comparing pre-recorded speech signals.

Further, the present invention provides a method and system to predict when a speech recognizer will confuse spoken phrases by directly using one text form of a spoken phrase and an audio file of the spoken phrase. Therefore, the method and system according to the present invention can predict when a speech recognizer will confuse spoken phrases by directly using at least a text form of a spoken phrase.

Further, the present invention provides a method and system to predict when a speech recognizer will confuse spoken phrases in a telephony application, directly using one text form of a spoken phrase and an audio file of the spoken phrase.

Further, the present invention provides a method and system to predict when a speech recognizer will confuse any pair combination of a text form of a spoken phrase and an audio file of a spoken phrase.

Further, the present invention provides a method and system to predict when a speech recognizer will confuse spoken phrases by directly using text forms of the spoken phrases and strings of phonemes as an intermediate representation of the text forms. Further, the present invention can be attained by representing each text form with corresponding strings of phonemes and as a measure of the predicting transforming in a least cost value one of the strings of phonemes into another of the strings of phonemes.

Further, the present invention provides a method and system to predict when a speech recognizer will confuse spoken phrases by directly using one text form of a spoken phrase and one audio file of the spoken phrase, the text form and the audio file being further represented, as intermediate representations, with corresponding sequences of acoustic events. The present invention can be attained by representing a pair of representations of spoken phrases (i.e., any combination of a text form of a spoken phrase and an audio file of a spoken phrase to be recognized by a speech recognizer) with corresponding sequences of acoustic events based on phonetic capabilities of speakers obtained from acoustic signals of the pair of representations, matching the sequences of acoustic events, and predicting when a speech recognizer will confuse the spoken phrases according to the matching. The predicting is according to a formula $2K/(T)$, wherein K is a number of matched acoustic events from the matching and T is a total number of acoustic events.

Further, the present invention provides a method and system to predict when a speech recognizer will confuse two spoken phrases by using any pair combination of a text form of a spoken phrase and an audio file of a spoken phrase by any speaker, thereby the method and system being speaker independent.

Further, the present invention provides a method and system to predict when a speech recognizer will confuse two spoken phrases by using any pair combination of a text form of a spoken phrase and an audio file of a spoken phrase under any acoustic conditions, thereby the method and system being situation or environment independent.

Further, the present invention provides a method and system to predict when a speech recognizer will confuse spoken phrases in any language, thereby the method and system being language independent.

Further, the present invention provides a method and system to assign a cost to each operation of a transformation rule to transform one string of phonemes into another string of phonemes.

Further, the present invention provides a method and system to determine a confusability threshold value used to determine when a speech recognizer will confuse two spoken text phrases. The present invention can be attained by a computer system programmed/configured to calculate an acoustic confusability measure as a least cost to transform a first string of phonemes corresponding to a first text phrase to a second string of phonemes corresponding to a second text phrase, the system further comprising a processor programmed/configured to determine confusability of example pairs of audio files using a speech recognizer, and to calculate a confusability threshold value based upon the determined confusability, the threshold value compared to the least cost to determine when a speech recognizer will confuse the two text phrases when spoken to the speech recognizer.

The processes according to embodiments of the present invention can be implemented in software controlling a computer system (such as computing devices and personal computers) to perform the processes. Additional advantages of the invention will be set forth in part in the following description and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 6 is an example calculation of acoustic confusability based on acoustic measures of the phrases in FIGS. 3 and 4.

DESCRIPTION OF THE PREFERRED EMBODIMENTS

Figure 1:
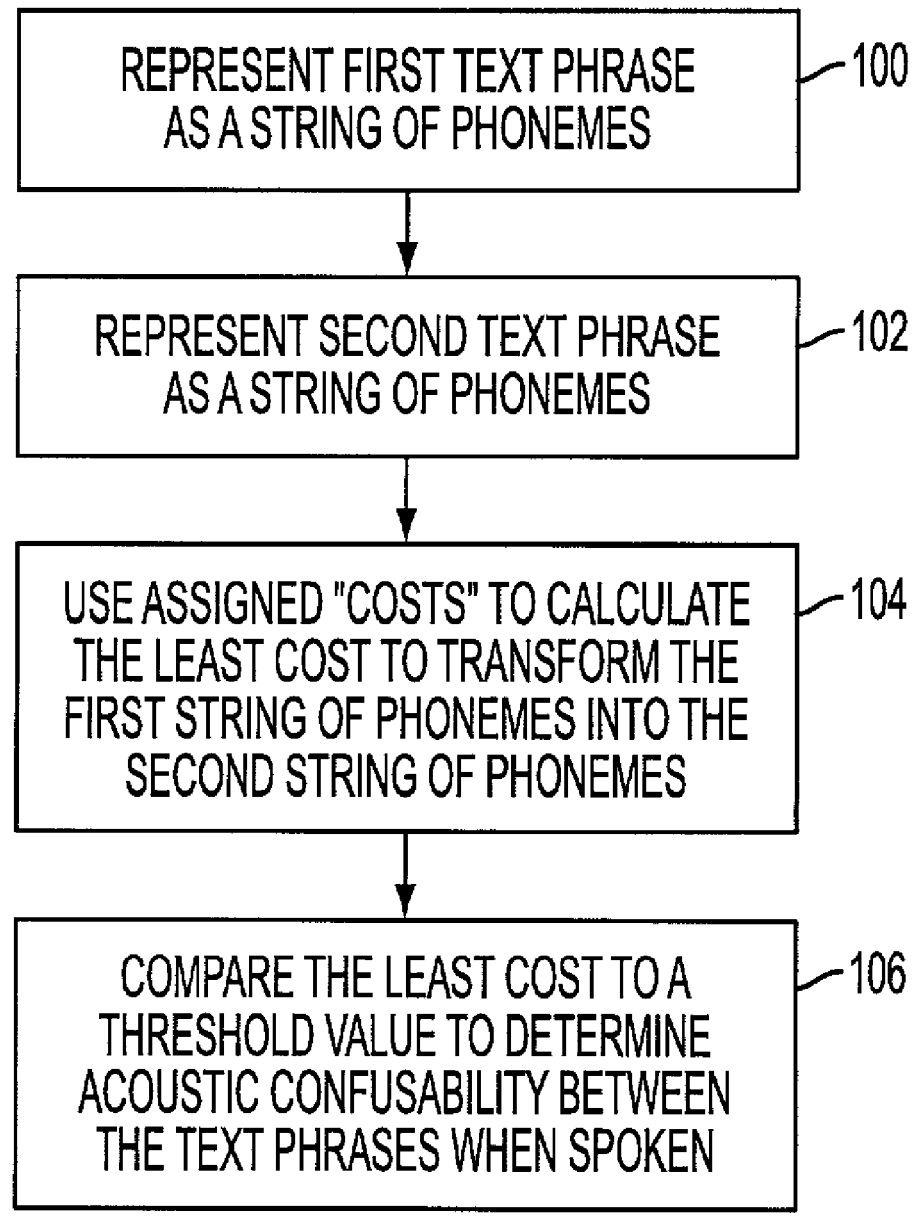
FIG. 1 is a flow diagram of a first embodiment of software according to the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

First Embodiment (case 1):

A first embodiment (case 1) of the present invention provides a method and system to predict when a speech recognizer will confuse spoken phrases by directly using text representations of utterances. Therefore, the method and system according to the present invention can predict when a speech recognizer will confuse spoken phrases without access to audio files (spoken examples) and not tied to comparing pre-recorded speech signals.

FIG. 1 is a flow diagram of a process to predict acoustic confusability according to the first embodiment. The first embodiment predicts the confusability between two text phrases when spoken. In FIG. 1, at 100 and 102 each text phrase is converted to a corresponding string of phonemes. Any available or conventional transcription method may be used at 100 and 102. For example, a text phrase can be transformed into a corresponding string of phonemes the following three ways: a conventional software tool, such as a commercially available dictionary of phonemes, can be used at 100 and 102 to search the corresponding strings of phonemes associated with the text phrases. Further, a conventional text-to-phoneme algorithm may be used to transform a text phrase into a string of phonemes. The text-to-phoneme algorithm may be useful when a text phrase is not listed in a text-to-phoneme dictionary. Further, a phoneme string may be determined heuristically from the text representation by a phonetician.

The present invention defines the confusability of two text phrases when spoken based on the cost of transforming one of the strings of phonemes into another of the string of phonemes. The present invention applies a conventional "Minimum String Edit Distance" (String Edit Distance) algorithm to the two strings of phonemes representing the two text phrases to determine the distance between the two strings of phonemes. In FIG. 1, at 104 the "Minimum String Edit Distance" between the two phoneme strings is calculated to determine how different are the two phoneme strings according to a series of transformations. The distance between the two strings of phonemes can represent a "cost" to change one string of phonemes into another string of phonemes according to the transformation, the "cost" providing an acoustic confusability measure (discussed in more detail below). The transformations specify operations to transform one string of phoneme into another string of phonemes. Representative transformations include INSERT (inserting a new phoneme symbol anywhere), DELETE (deleting a phoneme symbol) and SUBSTITUTE (replacing any one phoneme symbol with another phoneme symbol). Using these transformations, the phoneme string "X Y Z Z Y" can be transformed into "A Y Z Y" by, for example, substituting A for the initial X and then deleting the first Z. Of course, there are other ways of applying the sequence of transformations, and other transformations may be defined.

Standard "Minimum String Edit Distance" algorithms as implemented in software (by a dynamic programming algorithm) can be used to calculate the "Minimum String Edit Distance" at 104. For example, Wagner, R A and Fischer, M J (1974), *The string-to-string correction problem*, Journal of the Association for Computing Machinery, 21, 168–173; and Cormen, Leiserson, and Rivest (1990), *Introduction to Algorithms*, Cambridge, Mass.: MIT Press (the contents of which are hereby incorporated by reference), describe "Minimum String Edit Distance" algorithms. Using a Minimum String Edit Distance algorithm, the distance between the strings of phonemes can be calculated as a "cost" to transform the first string of phonemes into the second string of phonemes according to a transformation. More particularly, the algorithm can determine the optimal (lowest or least cost) way to change one string of phonemes into another string of phonemes. The "cost" can be based upon the following: the minimum number of transformations. By this measure, the cost of the exemplary transformation above is 2. Further, each type of transformation may be assigned a cost. For example, if any deletion costs 10 and any substitution costs 20, then the cost of the exemplary transformation above is 30. Further, costs can be assigned on a phoneme-by-phoneme basis for each operation. For example, to ADD a particular phoneme may cost a number of units and to ADD another phoneme may cost a different number of units. For example, the "cost" of a DELETE can depend on what phoneme symbol is deleted, and the "cost" of a SUBSTITUTE can depend on both the phoneme symbol that is changed and the new phoneme symbol to be substituted.

The first embodiment of the present invention defines confusability of two text phrases when spoken based on a cost of transforming a string of phonemes corresponding to a first text phrase into another string of phonemes corresponding to a second text phrase. When costs are assigned on a phoneme-by-phoneme basis for each operation of a transformation, in the preferred first embodiment of the present invention such costs are assigned based on acoustic similarity or dissimilarity of a pair of phonemes subject to an operation of the transformation rule. For example, the more acoustically similar a pair of phonemes, the lower the cost, which would be assigned. Conversely the more acoustically distinct the pair of phonemes, the higher the cost, which would be assigned. Using the exemplary transformation rule discussed above, the cost to SUBSTITUTE a phoneme corresponding to 'm' with a phoneme corresponding 'n' may be low because of a high acoustic similarity of these phonemes. Using such a cost assignment process, a higher cost would suggest less confusability and a lower cost would suggest more confusability. For example, a zero cost would indicate total confusability or identical spoken phrases. Conversely, as the cost increases toward infinity, the spoken phrases would be deemed more distinct.

The transformation cost is used as a measure of confusability. In FIG. 1 at 106 the calculated cost at 104 is compared to a threshold to determine acoustic confusability of text phrases when spoken. The threshold can be application dependent with different applications requiring different thresholds. A calculated cost at 104 above the threshold would indicate that the text phrases when spoken are distinct. A calculated cost at 104 below the threshold would indicate that the text phrases when spoken are confusable.

The first embodiment of the present invention uses phoneme strings of text phrases as intermediate representation of the text phrases. The distance metric represents the acoustic distinctiveness of phonemes, that is, how different the phonemes sound. Although, an alternate method to directly using text phrases to predict acoustic confusability of the text phrases when spoken would be to use speech signals generated by commercially available text-to-speech (TTS) software and using a conventional speech recognizer to compare spoken phrases; such a process has disadvantages as follows: a speech recognizer cannot use the speech (audio file) produced by a TTS in a useful way for speech recognition because of the quality of the speech. Further, using TTS limits acoustic confusability prediction by tying the prediction to measures of acoustic similarity implemented in the particular speech recognition system.

The present invention advantageously provides the following: a reliable prediction of confusability independent of any particular speech recognition system. Further, the present invention provides a reliable prediction of confusability that is language independent. Further, the present invention provides confusability predictability between text phrases when spoken, which has applications such as, for example, text-enrolling names from an address book software to a voice-enrolled address book of a voice messaging system or assisting voice application developers in developing more accurate voice user interfaces by avoiding using voice commands confusable by the speech recognizer.

As discussed above, given a transformation rule and a set of costs for each operation of the transformation rule, a Minimum String Edit Distance algorithm can quickly calculate the distance between two strings of phonemes. The Minimum String Edit Distance algorithm can provide a cost to transform the first string of phonemes into the second string of phonemes according to the transformation rule and the set of costs. Confusability of text phrases when spoken can be determined by comparing the calculated cost to a predetermined threshold. Therefore, there is also a need for a method and system to provide the set of costs input to the Minimum String Edit Distance algorithm as well as to generate/calculate the predetermined threshold, as follows:

1. Generating the Cost Matrix:

As discussed above, the costs on a phoneme-by-phoneme basis associated with each transformation operation, such as the INSERT, DELETE and SUBSTITUTION operations, are preferably tied to the characteristics of the phonemes. Therefore, a cost matrix can be generated the following ways:

For example, a phonetician can generate a cost matrix of phoneme pairs similar to a phonetician creating transcription for a text-to-phoneme dictionary. This method may be preferable because the predictability information will be completely or substantially speaker and speech recognizer independent.

Further, costs can be assigned based on acoustic similarity or dissimilarity of a pair of phonemes using a conventional speech recognizer. Although, predictability information will still be speaker and speech recognizer independent, increased use of the speech recognizer may cause the predictability information to become speech recognizer dependent. A typical speech recognizer includes mathematical models of phonemes used for training the speech recognizer. The costs can be assigned based upon similarity or dissimilarity of these models. Further, costs can be calculated from arbitrary pairs of audio files and using the speech recognizer. The pairs of audio files can be input to the speech recognizer to determine a value based upon the speech recognizer confusing and not confusing audio files of the pairs. The determined value should be output when using the Minimum String Edit Distance algorithm at 104. Therefore, the determined value from using the speech recognizer can be used to reverse calculate (e.g., via least square approximation) costs in a phoneme-pair cost matrix. Further, costs can be calculated through experimentation using crafted audio files and using the speech recognizer. For example, inputting audio files for two utterances "I like hills" and "I like bike hills" into a speech recognizer set to recognize "I like hills" can be informative on the cost of substituting phoneme "b" for phoneme "I." Changing the second audio file to "I like halls" can be informative on substituting phoneme "ah" for "ih." Changing the second audio file to "I like hill" can be informative on deleting phoneme "z." And so forth.

Further, costs can be assigned based on acoustic similarity or dissimilarity of a pair of phonemes as disclosed, for example, in Greenberg, S. (2000), *Understanding Spoken Language using Statistical and Computational Methods*, Presented at Patterns of Speech Sounds in Unscripted Communication—Production, Perception, Phonology, Akademie Sandelmark, Germany, October 8–11; and Greenberg, S., and S. Chang. (2000), *Linguistic Dissection of Switchboard-Corpus: Automatic Speech Recognition Systems*, Presented at the ISCA Workshop on Automatic Speech Recognition: Challenges for the New Millennium, Paris, Sep. 18–20, 2000 (the contents of which are hereby incorporated by reference). This method may be preferable because the predictability information will be completely or substantially speech recognizer independent (i.e., speaker independent).

2. Determining a Threshold:

As discussed above, the calculated cost at 104 is compared to a threshold at 106 to determine acoustic confusability of text phrases when spoken. The threshold can be determined a follows: pairs of audio files can be input to a speech recognizer to assign a confusability value based upon the speech recognizer confusing spoken phrases corresponding to the pairs. A threshold or a threshold range can be determined based upon the examples of pairs of audio files determined to be confusable by the speech recognizer. Conversely pairs of audio files can be input to a speech recognizer to assign a distinctiveness value based upon the speech recognizer not confusing the spoken phrases of the pairs. Similarly, a threshold or a threshold range can be determined based upon the examples of pairs of audio files determined not to be confusable by the speech recognizer.

Figure 2:
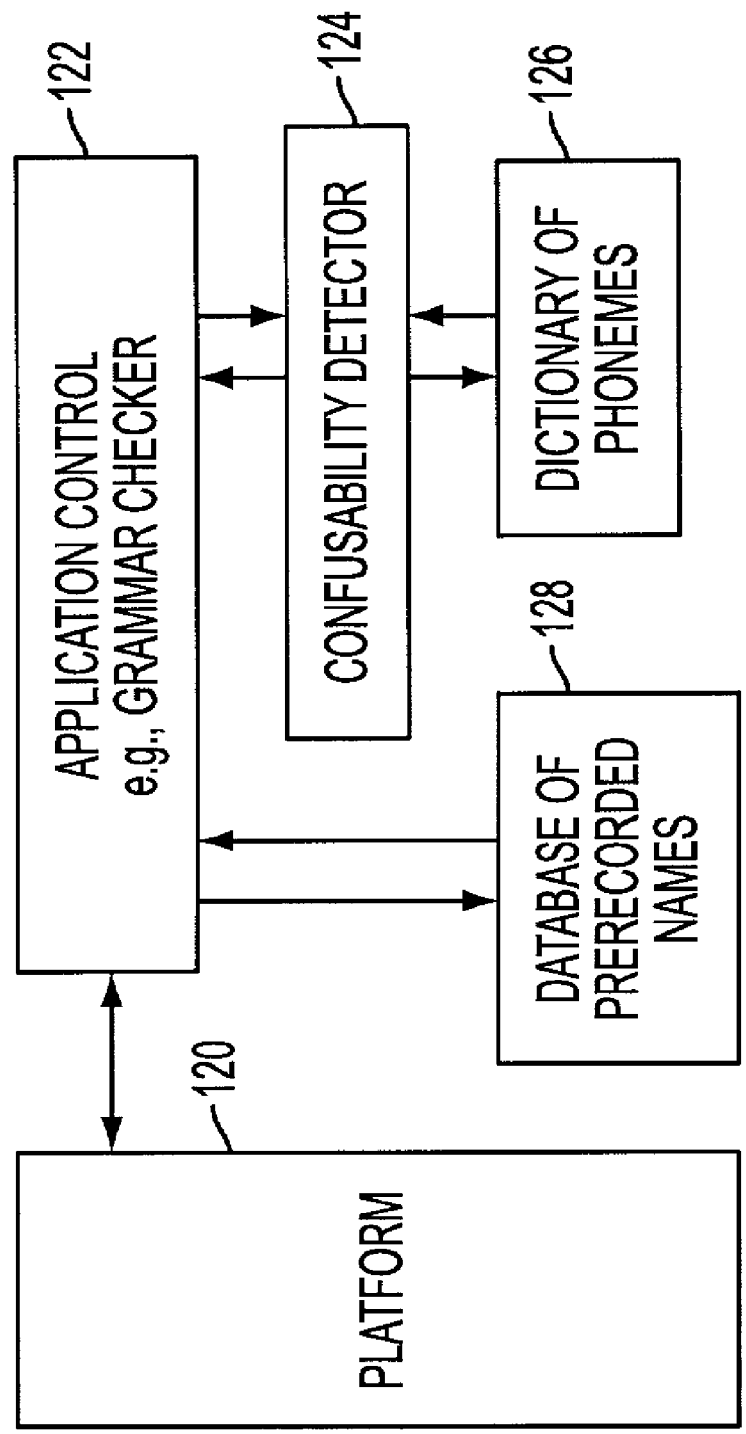
FIG. 2 is a block diagram of a computer system in which the first embodiment of the present invention is implemented.

FIG. 2 is a block diagram of an exemplary computer system in which the first embodiment of the present invention can be implemented. Platform 120 may be a conventional computing device, personal computer or other computer system, such as a voice messaging system. Such voice message systems are available from Comverse Network Systems, Inc., Wakefield, Mass., assignee of the present application, under the tradenames AccessNP® or Trilogue INfinity™ enhanced services platforms. Application control 122 is software executing on platform 120 and using acoustic confusability information. For example, application 122 can be grammar checker software to develop voice applications (i.e., call flows). The confusability detector 124 is software implementing the processes of the first embodiment of the present invention. Confusability detector 124 uses dictionary 126 to search strings of phonemes to provide intermediate representation of text phrases subject to confusability assessment. For example, the confusability detector 124 can be used to check voice commands input by a developer developing a voice user interface. The input voice commands, which are typically text representations of spoken phrases, can be compared with text phrases in database 128 to alert the developer when a voice command may be confusable with other voice commands already input. Application 122 responsive to the confusability detector 124 can recommend distinct voice commands or recommend against use of confusable voice commands.

Second Embodiment (Cases 1 and 2):

A second embodiment (cases 1 and 2) of the present invention provides a method and system to predict when a speech recognizer will confuse spoken phrases by using any combination of spoken phrase representations of a text form and an audio file, and a sequence of Acoustic Features (AFs) as an intermediate representation of the spoken phrase representations and as a metric of distinctiveness. The present invention can, for example, use the AFs disclosed by Stevens and Salomon. These Acoustic Features reflect the primary acoustic characteristics of spoken phrases. Similarities in strings of AFs correspond to similarities in pronunciation and therefore to confusability by a speech recognizer. The method can be used to calculate a "confusability metric" between any combination of a pair of spoken phrase representations (i.e., any combination of a text form of a spoken phrase and an audio file of a spoken phrase to be recognized by a speech recognizer).

Figure 3:
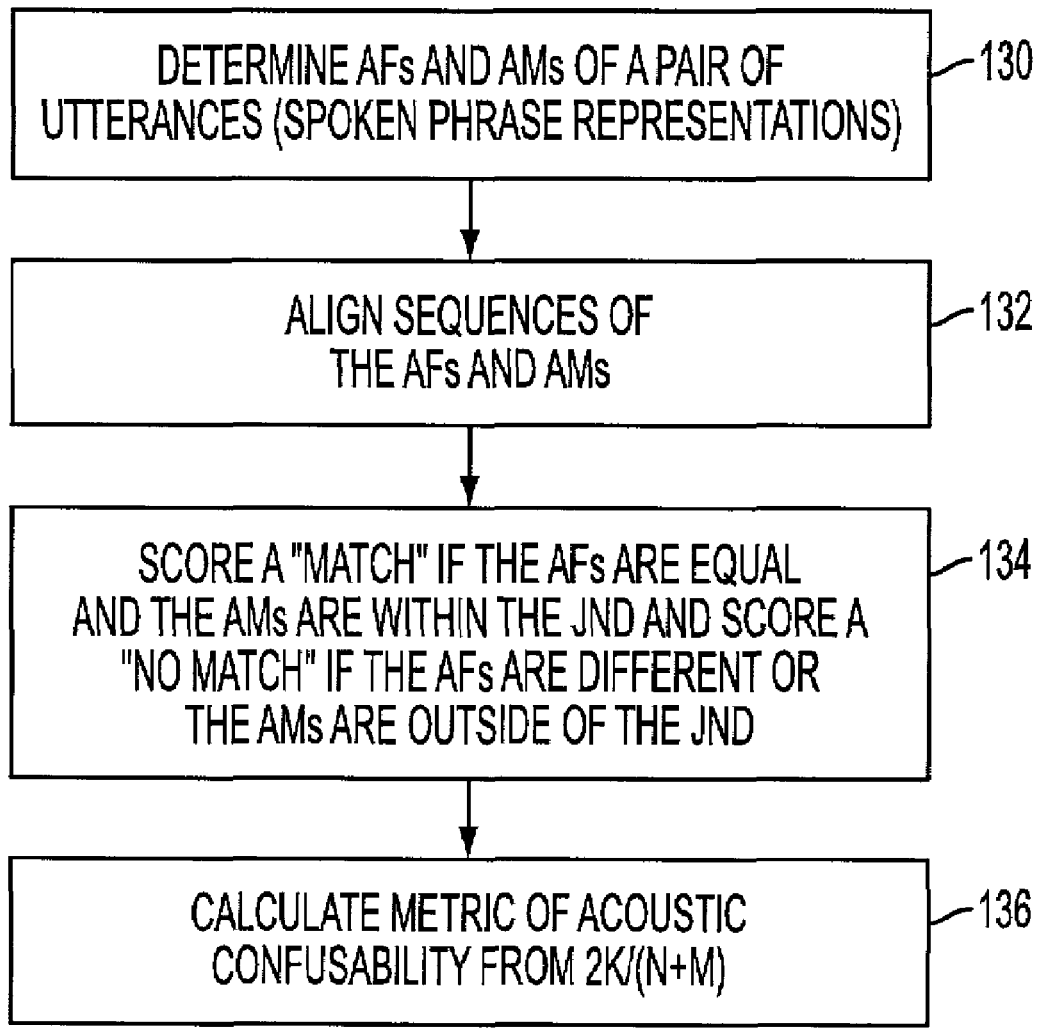
FIG. 3 is a flow diagram of a second embodiment of software according to the present invention.

FIG. 3 is a flow diagram of a process to predict acoustic confusability according to the second embodiment. The second embodiment predicts the confusability between any two representations of spoken phrases. In FIG. 3, at 130 the AFs of a pair of representations of spoken phrases are determined. The AFs of a text form of a spoken phrase can be determined in one of three ways: by lookup in a database (a dictionary of AFs of names and phrases); by calculation using conventional letter-to-sound algorithms; or by a combination of text-to-speech conversion from text form to an audio file followed by automatic calculation of the AFs by software such as that described in Liu, S. (1995), *Landmark Detection for Distinctive Feature-based Speech Recognition*, Ph.D. Thesis, Cambridge, Mass.: Massachusetts Institute of Technology (hereinafter Liu) or in Salomon (the contents of which are hereby incorporated by reference).

The AFs of an audio file of a spoken phrase can be determined by using, for example, the Liu and Salomon software.

The AFs determined at 130 can be the following: Syllabic Vowel, Syllabic Nasal, Syllabic Liquid, Semivowel, Nasal, Palatal Fricative, Alveolar Fricative, Affricate, Labial Stop, Alveolar Stop, Velar Stop, Weak Fricative. The onset and the offset of each of the syllabic and fricative AFs are marked by +AF and −AF, respectively, where AF represents one of the AFs.

In addition to the AFs, two additional Acoustic Measures (AMs) are needed for the calculation of confusability from an acoustic signal. The two AMs are derived (computed) from the fundamental frequency (F0) of the portions of the signal that are periodic, the frequency of the lowest-frequency spectral peak (F1), and the frequency of the second-lowest-frequency spectral peak (F2) as follows: F1−F0 and F2−F1. These two computed AMs of spectral energy are chosen because they are speaker-independent, and therefore can be used when comparing AFs computed from audio files of spoken phrases to AFs computed from text forms of spoken phrases. See Syrdal, A. (1984), *Aspects of an auditory representation of American English vowels*, Speech Communication Group Working Papers, Vol. IV, Research Laboratory of Electronics, Massachusetts Institute of Technology, 27–41 (the contents of which are hereby incorporated by reference).

The computed AMs F1−F0 and F2−F1 distinguish vowel identity within the syllabic vowels as well as nasal identity within the set of syllabic nasals. The F1−F0 and F2−F1 AMs can be computed at 20% and 70% of the duration of the AFs syllabic vowels, semivowels, and nasals (i.e. AMs at 20% and AMs at 70%). The F0 measure distinguishes between the voiced and voiceless members of each pair of AFs palatal fricative, alveolar fricative, affricate, labial stop, alveolar stop, velar stop, and weak fricative. See Nearey, T. M. and Assmann, P. (1986), *Modeling the role of vowel inherent spectral change in vowel identification*, Journal of the Acoustical Society of America 80, pp. 1297–1308 (hereinafter Nearey) (the contents of which are hereby incorporated by reference).

The strings of AFs and AMs determined at 130 are aligned at 132, as follows: the strings of AFs are aligned such that the ith Syllabic Vowel in each string is identified and the first vowels in each representation of the spoken phrases are aligned, the second vowels in each representation are aligned, etc. The alignment of AFs and AMs at 132 can be according to the methods disclosed in Fell, H. J., L. J. Ferrier, C. Espy-Wilson, S. G. Worst, E. A. Craft, K. Chenausky, J. MacAuslan, and G. Hennessey (2000),*Analysis of Infant Babbles by the Early Vocalization Analyzer*, Presented at the American Speech-Language-Hearing Convention, Nov. 17, 2000; Fell, H. J., J. MacAuslan, K. Chenausky, and L. J. Ferrier (1998), *Automatic Babble Recognition for Early Detection of Speech Related Disorders*, Assets '98, Proceedings of the Third International ACM SIGCAPH Conference on Assistive Technologies, Marina del Rey, Calif.; and Fell, H. J., L. J. Ferrier, Z. Mooraj, E. Benson, and D. Schneider (1996), *EVA, an Early Vocalization Analyzer, An Empirical Validity Study of Computer Categorization*, Assets '96, Proceedings of the Third International ACM SIGCAPH Conference on Assistive Technologies (hereinafter Fell) (the contents of which are hereby incorporated by reference). A conventional Minimum String Edit Distance algorithm can also be used at 132.

The aligned AFs and AMs of the representations (i.e., text form or audio file) of the spoken phrases at 132 are compared at 134. For any pair of representations (i.e., text form or audio file) of spoken phrases, a "degree of confusability" is calculated based on closeness of match of the corresponding strings of AFs and AMs. An exact match of AFs coupled with a close (less than a "just noticeable difference") match in AMs results in a degree of confusability of 100%, or "the representations when spoken are very likely to be recognized as the same" by a speech recognizer. A speech recognizer is unlikely to confuse spoken phrases corresponding to the pair of representations of the spoken phrases having a low confusability metric.

The matching at 134 is performed as follows: the aligned AFs and AMs of the representations of the spoken phrases are compared to score a "match" or a "no match." An acoustic confusability metric as a scale from 0 (maximally different) to 1 (maximally same is calculated at 136 according to the formula (as described in more detail below):

$$\text{Confusability} = 2K/(N+M) \qquad (1)$$

In formula (1), K is the number of AFs and AMs that match out of N AFs and AMs in the first spoken phrase representation and M AFs and AMs in the second spoken phrase representation, where a match is defined by the rules for matching landmarks in accordance with the method disclosed in Fell. More particularly, N+M is a total (T) number of acoustic characteristics in the sequences of acoustic characteristics for both phrases (i.e., T=N+M). Therefore, for any pair of spoken phrase representations (e.g., both text form, one text form and one audio file, or both audio files) a degree of confusability can be calculated based on closeness of match of the sequences of the AFs and AMs determined at 130. A metric of confusability provides that for K aligned AFs that match exactly and AMs that "match"

within a "Just Noticeable Difference" (JND), out of a total of N AFs and AMs in one phrase and M AFs and AMs in the other, X=2K/(N+M), X being the metric of confusability.

Figure 4:
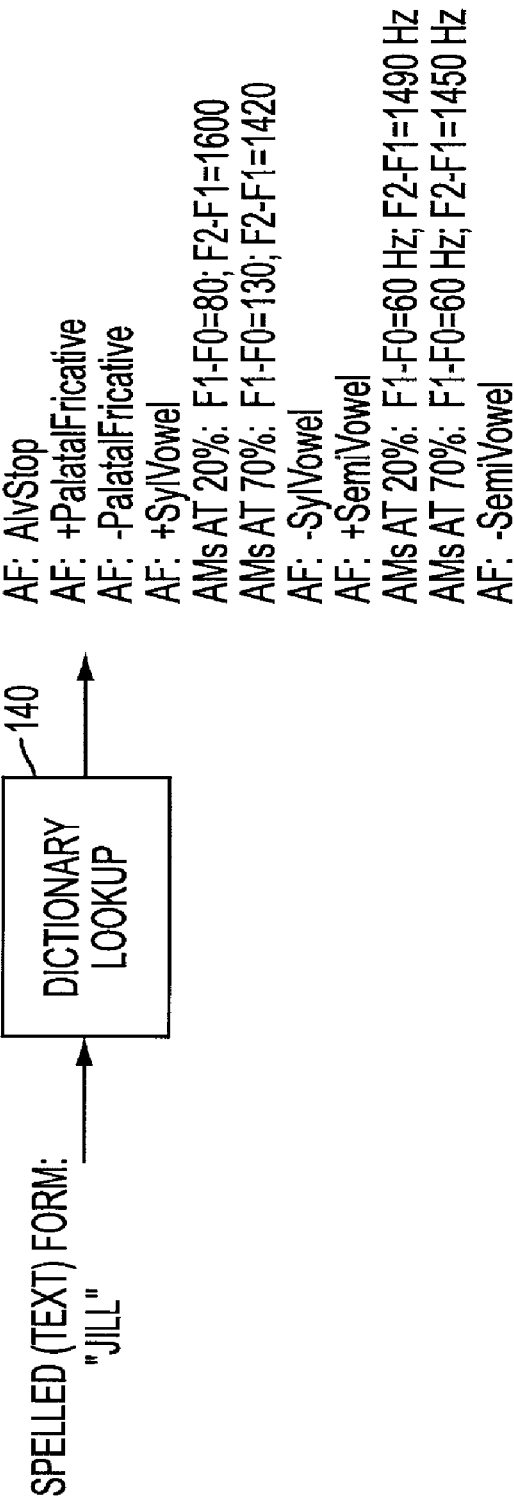
FIG. 4 is a flow diagram of a process according to the second embodiment to represent text representation of a spoken phrase with corresponding sequences of AFs and AMs.
Figure 5:
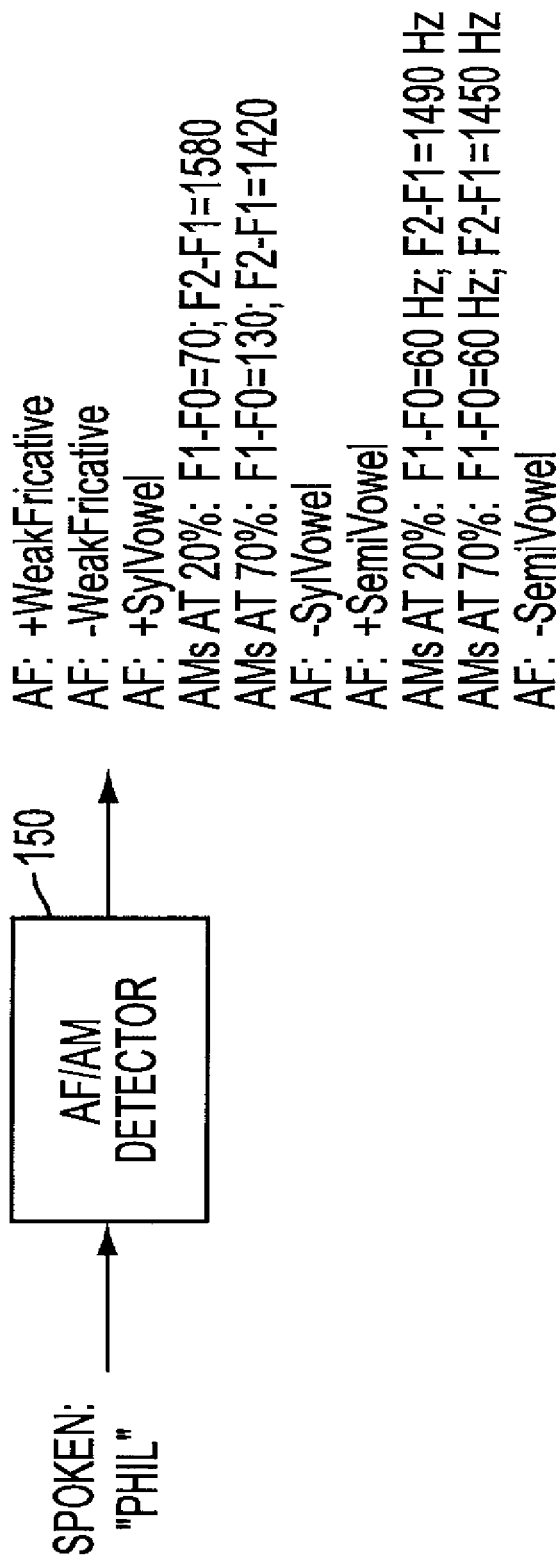
FIG. 5 is a flow diagram of another process according to the second embodiment to represent a spoken phrase with corresponding sequences of AFs and AMs.

FIGS. 4, 5 and 6 show an example of a comparison of the audio file of utterance "Jill" and the text form of utterance "Phil" according to the process of FIG. 3 to predict confusability by a speech recognizer between the two utterances (spoken phrase representations). In FIG. 4, the AFs and AMs for the text form "Jill" are determined using a dictionary 140. As illustrated in FIG. 4, in "Jill," measured values at vowel onset are F1–F0=80 Hz, F2–F1=1600 Hz; at vowel offset, F1–F0=130 Hz and F2–F1=1420 Hz; at semivowel onset, F1–F0=60 Hz, F2–F1=1490 Hz; and at semivowel offset, F1–F0=60 Hz, and F2–F1=1450 Hz.

In FIG. 5, the AFs and AMs for the audio file (conventional recorded speech signals) "Phil" are determined using an AF/AM detector 150. The detector 150 can detect the AFs and AMs using the methods/software disclosed in Liu and Salomon. As illustrated in FIG. 5, in "Phil," measured values at vowel onset are F1–F0=70 Hz, and F2–F1=1580 Hz; at vowel offset, F1–F0=130 Hz, and F2–F1=1420 Hz; at semivowel onset, F1–F0=60 Hz and F2–F1=1490 Hz; and at semivowel offset F1–F0=60 Hz, and F2–F1=1450 Hz.

FIG. 6 illustrates alignment of the AFs and AMs for "Jill" and "Phil" (at 132 in FIG. 3). FIG. 6 also illustrates matching of the AFs and AMs for the two representations of spoken phrases "Jill" and "Phil" (at 134 in FIG. 3). A "Match" is scored if the AFs are equal and the AMs are within the JND (noted) and a "No Match" is scored if the AFs are different and the AMs are outside of the JND (noted). An acoustic confusability metric for the two representations of spoken phrase "Jill" and "Phil" is calculated according to the formula (1) (at 136 in FIG. 3). For the JND ranges of 30 Hz in 0–500 Hz, 50 Hz in 501–1000 Hz, 70 Hz in 1001–2000 Hz, 100 Hz in 2001–4000 Hz, and 200 Hz above 4001 Hz, the acoustic confusability of "Jill" with "Phil" metric is approximately 0.76, as illustrated in FIG. 6. The computed acoustic confusability can be used depending on design specifications, for example, by voice application developers to improve grammar of voice user interfaces (i.e., to reduce confusability by speech recognizers used in the voice applications).

One advantage of the metric described for measuring confusability of representations of spoken phrases from AFs and AMs is its simplicity. This simplicity is a direct result of the AFs and AMs being chosen to reflect salient acoustic characteristics of speech. Thus much of the work of determining acoustic confusability is directly available in the AF and AM intermediate representation of any spoken phrase representations evaluated for confusability.

The described second embodiment of the present invention may be embodied in other specific forms. For example, the present invention is not limited to using the Salomon AFs and Syrdal AMs, and other phonetic features derived from spectral analysis of the speech signal (i.e., salient acoustic characteristics of speech) can be used. Further, certain AFs can be omitted from comparison (matching) to improve the comparing, for example, when the speech signals include background noise. Therefore, the present invention can provide situation independent acoustic confusability information (i.e., predict acoustic confusability under adverse acoustic conditions). Further, a "match" of AFs and AMs can be varied according to a degree of closeness. For example, a "match" of the F2–F1 and F1–F0 can be within the JND as described by Nearey. Further, although the exemplary second embodiment uses Fell to align and compare the acoustic measures, the present invention is not limited to using Fell and other algorithms can be used. For example, the second embodiment can use a standard Minimum String Edit Distance algorithm for the comparing at 134.

The second embodiment uses the acoustic characteristics of speech (e.g., AFs and AMs) as an intermediate representation of spoken phrases subject to confusability assessment. The second embodiment of the present invention provides confusability predictability between any two types of representations of spoken phrases, which has applications such as, for example, text-enrolling names from an address book software to a voice-enrolled address book of a voice messaging system, assisting voice application developers in developing more accurate/reliable voice user interfaces by avoiding using voice commands confusable by the speech recognizer and allowing voice enrollment of names in a voice-enrolled address book and access to voice messages in a voice messaging system by users other than the subscriber of a mailbox.

Figure 7:
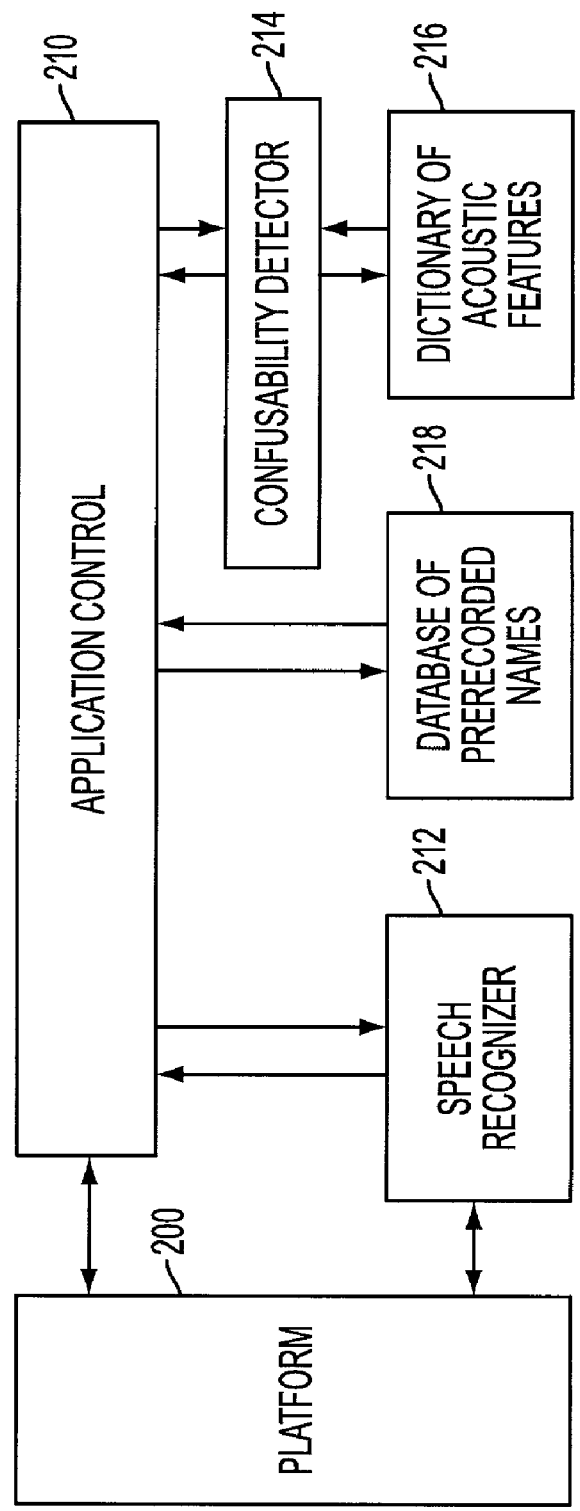
FIG. 7 is a block diagram of a computer system in which the second embodiment of the present invention is implemented.

FIG. 7 is a block diagram of an exemplary embodiment of a computer system in which the second embodiment of the present invention is implemented. Application control 210 can be a voice application software providing a voice user interface, using the speech recognizer 212 to process voice commands. The Application control 210 can execute on the platform 200 or execute on other computing devices, such as portable computing devices, wireless telephones or personal computers and interact using conventional techniques with software on the platform 200 to perform voice message processing. Confusability detector 214 is software executing on platform 200 and embodying the methods of the second embodiment of the present invention as described above in FIGS. 3–6. Confusability detector 214 can use dictionary 216 when determining the AFs of a text phrase input (at 130 in FIG. 3). The Application control 210 can, for example, use the confusability detector 214 to enroll text names in a voice-enrolled name address book database 218.

The present invention provides a method and system of predicting when a speech recognizer will confuse spoken phrases where utterances (spoken phrase representations) can be represented by any combination of text form (spelled) and audio file (conventional recorded speech signals). For example, the present invention provides a method and system of predicting when a speech recognizer will confuse spoken phrases where at least one of the representations of the spoken phrases is in text form. The present invention can be attained by representing a pair of utterances with an intermediate representation that directly reflects the salient acoustic characteristics of the utterances when spoken (for example, phoneme strings described in connection with the first embodiment and AFs and AMs described in connection with the second embodiment), thereby providing acoustic distinctiveness, or inversely, similarity information. The intermediate representation is not tied to pre-recorded speech signals, thereby providing a method and system to predict confusability of spoken phrases that can be speaker independent and acoustic condition independent (i.e., confusability may be predicted even when background noise is present). More particularly, the present invention's choice of intermediate representation is useful in providing speech recognizer independent (i.e., speaker independent) and situation independent speech recognition and acoustic confusability information. Further, the present invention can provide a method and system to predict when a speech recognizer will confuse text phrases when spoken by directly using the text without converting the text to an audio file (conventional speech signal).

Although a few preferred embodiments of the present invention have been shown and described, it would be appreciated by those skilled in the art that changes may be made in this embodiment without departing from the principles and spirit of the invention. The scope of the present invention is defined in the claims and the claims' equivalents.

What is claimed is:

1. A process comprising:
    representing each text form of two spoken phrases with a first and second strings of phonemes, respectively;
    assigning costs to transform the first string to the second string of phonemes according to a speech recognizer confusability of arbitrary pairs of audio files; and
    calculating an acoustic confusability measure as a least cost, according to the cost assigning, to transform the first string of phonemes to the second string of phonemes, thereby predicting when a speech recognizer will confuse the two spoken phrases by directly using text forms of the spoken phrases.

2. The process according to claim 1, wherein a dynamic programming minimum string edit distance algorithm computes the least cost.

3. The process according to claim 1, further comprising using different cost values for each operation to transform depending on the characteristics of phonemes in the strings.

4. The process according to claim 3, further comprising comparing the least cost to a threshold value to predict whether the speech recognizer will confuse the spoken phrases corresponding to the text forms.

5. A process comprising:
    representing text phrases with corresponding strings of phonemes;
    calculating an acoustic confusability measure as a least cost to transform one of the strings of phonemes into another of the strings of phonemes;
    determining and adjusting, using a speech recognizer, a threshold value according to confusability of example pairs of spoken phrases represented as audio files; and
    comparing the least cost to the threshold value to determine acoustic confusability of the text phrases when spoken to a speech recognizer.

6. A process, comprising:
    representing text phrases with corresponding strings of phonemes;
    calculating a distance between the strings of phonemes using a string edit distance algorithm as a least cost to transform according to a series of transformations one of the strings of phonemes into another of the strings of phonemes;
    determining and adjusting, using a speech recognizer, a threshold value according to confusability of example pairs of spoken phrases represented as audio files; and
    comparing the least cost to the threshold value to predict when a speech recognizer will confuse spoken phrases of the text phrases.

7. The process according to claim 6, wherein each transformation is assigned a cost depending on characteristics of phonemes.

8. The process according to claim 6, wherein the transformations comprise insertion of a phoneme, substitution of a phoneme with another phoneme and/or deletion of a phoneme.

9. A process comprising calculating an acoustic confusability measure as a least cost to transform a first string of phonemes corresponding to a first text phrase to a second string of phonemes corresponding to a second text phrase, the process further comprising:
    determining confusability of example pairs of audio files using a speech recognizer;
    calculating a confusability threshold value based upon the determined confusability, the threshold value compared to the least cost to determine when a speech recognizer will confuse spoken phrases of the two text phrases.

10. A computer system, comprising:
    a processor programmed to control the computer system according to a process comprising:
        representing each text form of two spoken phrases with a first and second strings of phonemes, respectively,
        assigning costs to transform the first string to the second string of phonemes according to a speech recognizer confusability of arbitrary pairs of audio files, and
        calculating an acoustic confusability measure as a least cost, according to the cost assigning, to transform the first string of phonemes to the second string of phonemes, thereby predicting when a speech recognizer will confuse two spoken phrases by directly using text representations of the spoken phrases.

11. A computer system, comprising:
    a processor programmed to represent text phrases with corresponding strings of phonemes, to calculate an acoustic confusability measure as a least cost to transform one of the strings of phonemes into another of the strings of phonemes, to determine and adjust, using a speech recognizer, a threshold value according to confusability of example pairs of spoken phrases represented as audio flies, and to compare the least cost to the threshold value to determine acoustic confusability of the text phrases when spoken to a speech recognizer.

12. A computer system, comprising:
    a processor programmed to represent text phrases with corresponding strings of phonemes, to calculate a distance between the strings of phonemes using a string edit distance algorithm as a least cost to transform according to a series of transformations one of the strings of phonemes into another of the strings of phonemes, to determine and adjust, using a speech recognizer, a threshold value according to confusability of example pairs of spoken phrases represented as audio files, and to compare the least cost to the threshold value to predict when a speech recognizer will confuse spoken forms of the text phrases.

13. The computer system according to claim 12, wherein each transformation is assigned a cost depending on characteristics of phonemes.

14. A computer system programmed to calculate an acoustic confusability measure as a least cost to transform a first string of phonemes corresponding to a first text phrase to a second string of phonemes corresponding to a second text phrase, the system further comprising:
    a processor programmed to determine confusability of example pairs of audio files using a speech recognizer, and to calculate a confusability threshold value based upon the determined confusability, the threshold value compared to the least cost to determine when a speech recognizer will confuse spoken form of the two text phrases.

15. A process of predicting when a speech recognizer will confuse two spoken phrases where two utterances corresponding to the spoken phrases in any combination of text and audio file are available to a confusability prediction algorithm, comprising:

representing each utterance with corresponding sequences of acoustic characteristics based on phonetic capabilities of speakers obtained from acoustic signals of the utterances;

aligning the sequences of acoustic characteristics;

comparing the sequences of acoustic characteristics; and calculating a metric of acoustic confusability according to a formula 2K/(T), wherein K is a number of acoustic characteristics that match from the comparing and T is a total number of acoustic characteristics in the sequences of acoustic characteristics for both utterances.

16. The process according to claim 15, wherein the spoken phrases are in any language.

17. The process according to claim 16, wherein the metric of acoustic confusability is used in telephony applications.

18. A process comprising:

representing two utterances that are in any combination of a text form and an audio file with corresponding sequences of acoustic characteristics based on phonetic capabilities of speakers obtained from acoustic signals of the utterances;

aligning the sequences of acoustic characteristics;

comparing the sequences of acoustic characteristics; and calculating a metric of acoustic confusability according to the comparing.

19. The process according to claim 18, wherein the utterances are in any language.

20. A process comprising:

representing two utterances with corresponding sequences of acoustic characteristics based on phonetic capabilities of speakers obtained from acoustic signals of the utterances;

aligning the sequences of acoustic characteristics;

comparing the sequences of acoustic characteristics; and calculating a metric of acoustic confusability according to a formula 2K/(T), wherein K is a number of acoustic characteristics that match from the comparing and T is a total number of acoustic characteristics in the sequences of acoustic characteristics for both utterances.

21. The process according to claim 20, wherein the utterances are in any language.

22. A process, comprising:

representing a first phrase and a second phrase, respectively, with a corresponding sequence of acoustic features and acoustic measures obtained from a dictionary of acoustic features and a database of prerecorded audio files;

aligning the sequence of acoustic features and acoustic measures of the first phrase with the sequence of acoustic features and acoustic measures of the second phrase;

comparing the aligned first phrase and second phrase sequences; and calculating a metric of acoustic confusability according to the comparing according to a formula 2K/(N+M), wherein K is a number of acoustic features and acoustic measures that match from the comparing and N is a number of acoustic features and acoustic measures in the first phrase and M is a number of acoustic features and acoustic measures in the second phrase.

23. A computer system, comprising:

a processor programmed to predict when a speech recognizer will confuse two spoken phrases where two phrases in any combination of text and spoken form are available to a confusability prediction algorithm, according to a process comprising:

representing each phrase with corresponding sequences of acoustic characteristics based on phonetic capabilities of speakers obtained from acoustic signals of the phrases;

aligning the sequences of acoustic characteristics;

comparing the sequences of acoustic characteristics; and calculating a metric of acoustic confusability according to a formula 2K/(T), wherein K is a number of acoustic characteristics that match from the comparing and T is a total number of acoustic characteristics in the sequences of acoustic characteristics for both phrases.

24. The computer system according to claim 23, wherein the phrases are in any language.

25. The computer system according to claim 24, wherein the metric of acoustic confusability is used in telephony applications.

26. A computer system, comprising:

a processor programmed to represent two spoken phrases that are in any combination of a text form and an audio file with corresponding sequences of acoustic characteristics based on phonetic capabilities of speakers obtained from acoustic signals of the phrases, to align the sequences of acoustic characteristics, to compare the sequences of acoustic characteristics, and to calculate a metric of acoustic confusability according to the comparing.

27. The computer system according to claim 26, wherein the spoken phrases are in any language.

28. A computer system, comprising:

a processor programmed to represent a first phrase and a second phrase, respectively, with a corresponding sequence of acoustic features and acoustic measures obtained from a dictionary of acoustic features and a database of prerecorded audio files, to align the sequence of acoustic features and acoustic measures of the first phrase with the sequence of acoustic features and acoustic measures of the second phrase, to compare the aligned first phrase and second phrase sequences, and to calculate a metric of acoustic confusability according to the comparing according to a formula 2K/(N+M), wherein K is a number of acoustic features and acoustic measures that match from the comparing and N is a number of acoustic features and acoustic measures in the first phrase and M is a number of acoustic features and acoustic measures in the second phrase.

29. A process, comprising:

receiving two utterances in any combination of a text form and an audio file, the audio file having a speech signal recorded by any speaker and under any acoustic condition;

representing the two utterances with an intermediate representation that directly reflects the salient acoustic characteristics of the two utterances when spoken; and predicting when a speech recognizer will confuse the two utterances when spoken by using the intermediate representation of the two utterances.

30. The process according to claim 29, wherein results from the predicting is used in a telephony application.

31. A computer system, comprising:

a processor programmed to receive two phrases in any combination of text and spoken form, the spoken form spoken by any speaker and under any acoustic condition, to represent the two phrases with an intermediate representation that directly reflects the salient acoustic characteristics of the two phrases when spoken, and to predict when a speech recognizer will confuse the two phrases when spoken by using the intermediate representation of the two phrases.

32. The system according to claim 31, wherein results from the prediction is used in a telephony application.

33. A computer program, embodied on a computer-readable medium, comprising:
   an input segment receiving two utterances in any combination of a text form and an audio file, the audio file having speech signals recorded by any speaker and under any acoustic condition;
   a transformation segment representing the two utterances with an intermediate representation that directly reflects the salient acoustic characteristics of the two utterances when spoken; and
   a predicting segment predicting acoustic confusability of the two utterances when spoken to a speech recognizer using the intermediate representation of the two utterances.

* * * * *

UNITED STATES PATENT AND TRADEMARK OFFICE
CERTIFICATE OF CORRECTION

| | | |
|---|---|---|
| PATENT NO. | : 7,013,276 B2 | Page 1 of 1 |
| APPLICATION NO. | : 09/971012 | |
| DATED | : March 14, 2006 | |
| INVENTOR(S) | : Lawrence A. Denenberg et al. | |

It is certified that error appears in the above-identified patent and that said Letters Patent is hereby corrected as shown below:

Col. 16, line 32, change "flies" to --files--

Signed and Sealed this

Tenth Day of April, 2007

JON W. DUDAS
*Director of the United States Patent and Trademark Office*